(No Model.)

C. W. McLEAN.
MANUFACTURE OF GLASS BUILDING BLOCKS FOR SEA WALLS, &c.

No. 250,635. Patented Dec. 6, 1881.

WITNESSES
G. Johnson
A. H. Betz

INVENTOR
Christopher W. McLean,
By J. E. Brecht
his Attorney

United States Patent Office.

CHRISTOPHER W. McLEAN, OF NEW BERNE, NORTH CAROLINA.

MANUFACTURE OF GLASS BUILDING-BLOCKS FOR SEA-WALLS, &c.

SPECIFICATION forming part of Letters Patent No. 250,635, dated December 6, 1881.

Application filed October 4, 1881. (No model.)

*To all whom it may concern:*

Be it known that I, CHRISTOPHER W. MC-LEAN, a citizen of the United States, residing at New Berne, in the county of Craven and State of North Carolina, have invented certain new and useful Improvements in the Manufacture of Glass Building-Blocks for Sea-Walls, &c.; and I do hereby declare the following to be a full, clear, and exact description of the invention, such as will enable others skilled in the art to which it appertains to make and use the same.

Figure 1:
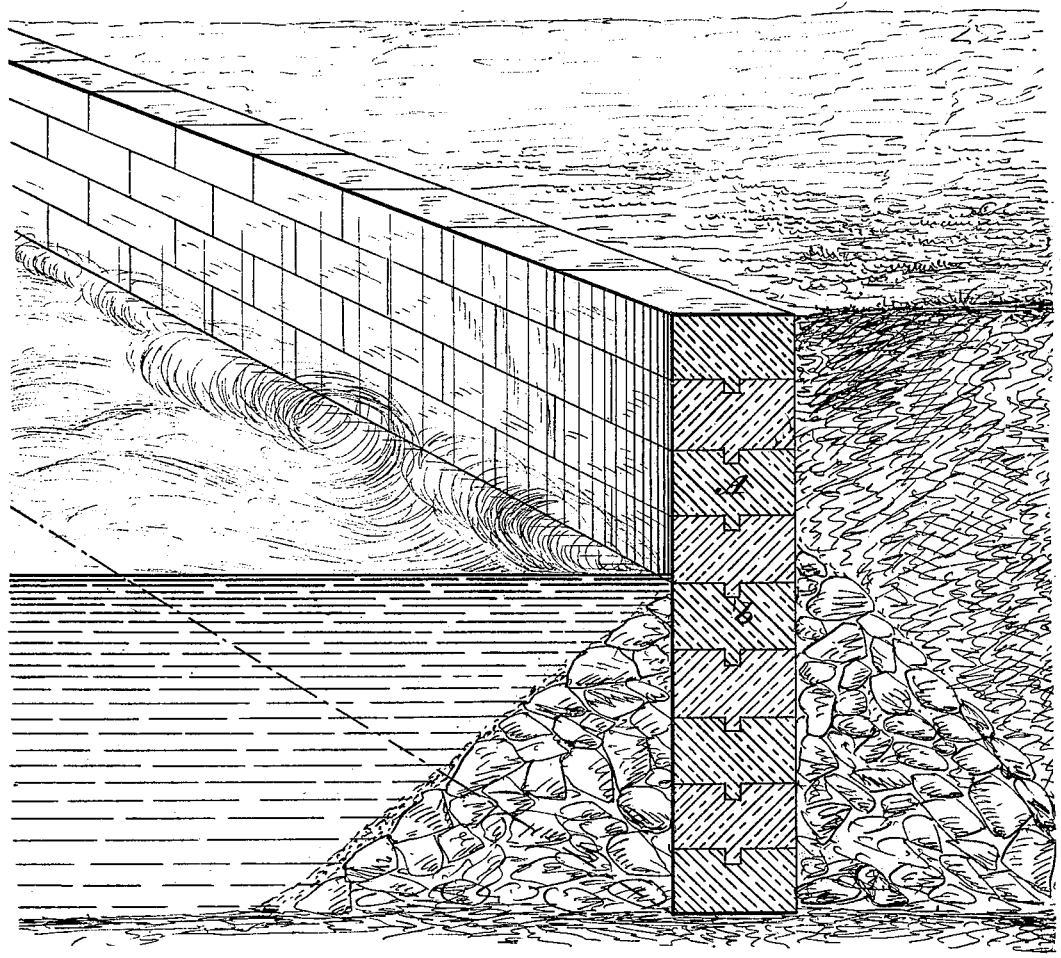
Figure 2:
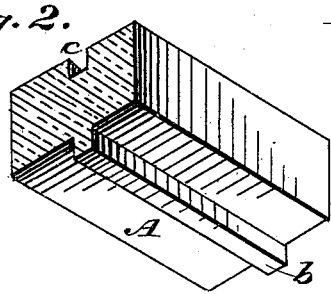
Figure 3:
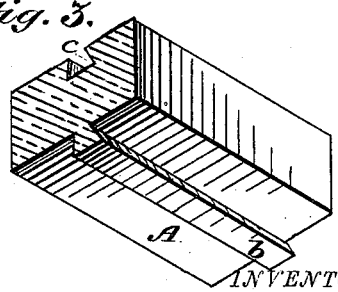

Figure 1 is a perspective view of a sea-wall or breakwater composed of blocks or slabs of glass tongued and grooved together. Fig. 2 is a view, in perspective, of a glass building block or slab provided with a plain tongue on one side and a corresponding groove on the other. Fig. 3 is a view, in perspective, of a block or slab of glass provided with a dove-tailed tongue on one side and a like groove on the other side.

The object of my invention is the manufacture of glass building-blocks for sea-walls, embankments of rivers, dykes, breakwaters, docks, &c. The materials for the construction of such works according to my invention are found on the spot where such structures are most needed, and have heretofore been rejected or overlooked, when they might have been utilized without the additional expense of transportation. This omission has arisen from an oversight on the part of owners of land in close proximity to the sea-shore and on the banks of rivers, for right under their feet and on the spot where such structures are most needed lie all the materials necessary for the building of walls and the reclaiming of good tillable land.

It has been said that " He who makes two blades of grass or two ears of corn grow where but one grew before deserves well of his country."

In many localities along the sea-coast and on the banks of rivers land can be reclaimed and Neptune deprived of a part of his domain at a comparatively low cost, for the principal requisites of a good sea-wall or embankment are the weight and quality of material of which such walls, &c., are constructed. In glass blocks or slabs we have these requisites not only in the weight of such material, but also the non-destructible qualities so essential in such structures. Artificial stone, concrete, beton, and even the natural stone give way to the constant wearing action of the waves and tides. The action of the frost and the constant changes from heat to cold have also much to do with the rapid disintegration and destruction of such walls.

In the drawings I have shown a wall composed of glass blocks with interlocking tongue and groove. The ends of the blocks may be provided with like tongues and grooves, to more effectually interlock with each other and form a strong and durable wall.

I do not confine myself to the precise construction of wall shown, for it is obvious that for breakwaters, &c., two walls running parallel with each other may be constructed, and the intermediate space between such walls filled in with concrete or similar material. As before stated, the materials for the manufacture of glass are found in abundance along the sea-coast and banks of rivers, and in carrying out my invention I propose to erect melting-furnaces within easy range or on the spot where the walls are to be constructed.

I may find in practice that a furnace mounted on wheels and adapted to travel on a suitable tramway will answer my purpose well. The molten glass is run into molds for the proper formation of the blocks, and the molds may be provided with a suitable internal heating-chamber, so that blocks may be annealed or toughened therein. Such molds I have more particularly described in an application marked "A," filed even date herewith.

A designates the blocks; *b*, the tongues, and *c* the grooves. Of course, the materials of which I propose to manufacture these blocks are of a coarser character than those used for glassware in general, and the glass produced will, as a natural consequence, be of a coarse texture, but will have all the requisites to withstand the wearing effect of the salt-water and the elements.

The essential feature of my invention being for the use of glass as a material forming the body of the structure of sea-walls, docks, breakwaters, &c., I do not restrict myself to any particular size, form, or mode of making the blocks.

Having thus described my invention, I claim—

1. A building-block made of glass, provided with tongues and grooves or other interlocking devices, for the construction of sea-walls, docks, breakwaters, dykes, &c.

2. Blocks of glass for building sea-walls, docks, breakwaters, or other analogous structures, substantially as and for the purpose specified.

In testimony whereof I hereto affix my signature in presence of two witnesses.

CHRISTOPHER W. McLEAN.

Witnesses:
A. H. BETZ,
T. C. BRECHT.